June 4, 1946.  A. W. VANCE  2,401,527
ELECTROMECHANICAL MULTIPLYING DEVICE
Filed March 30, 1943
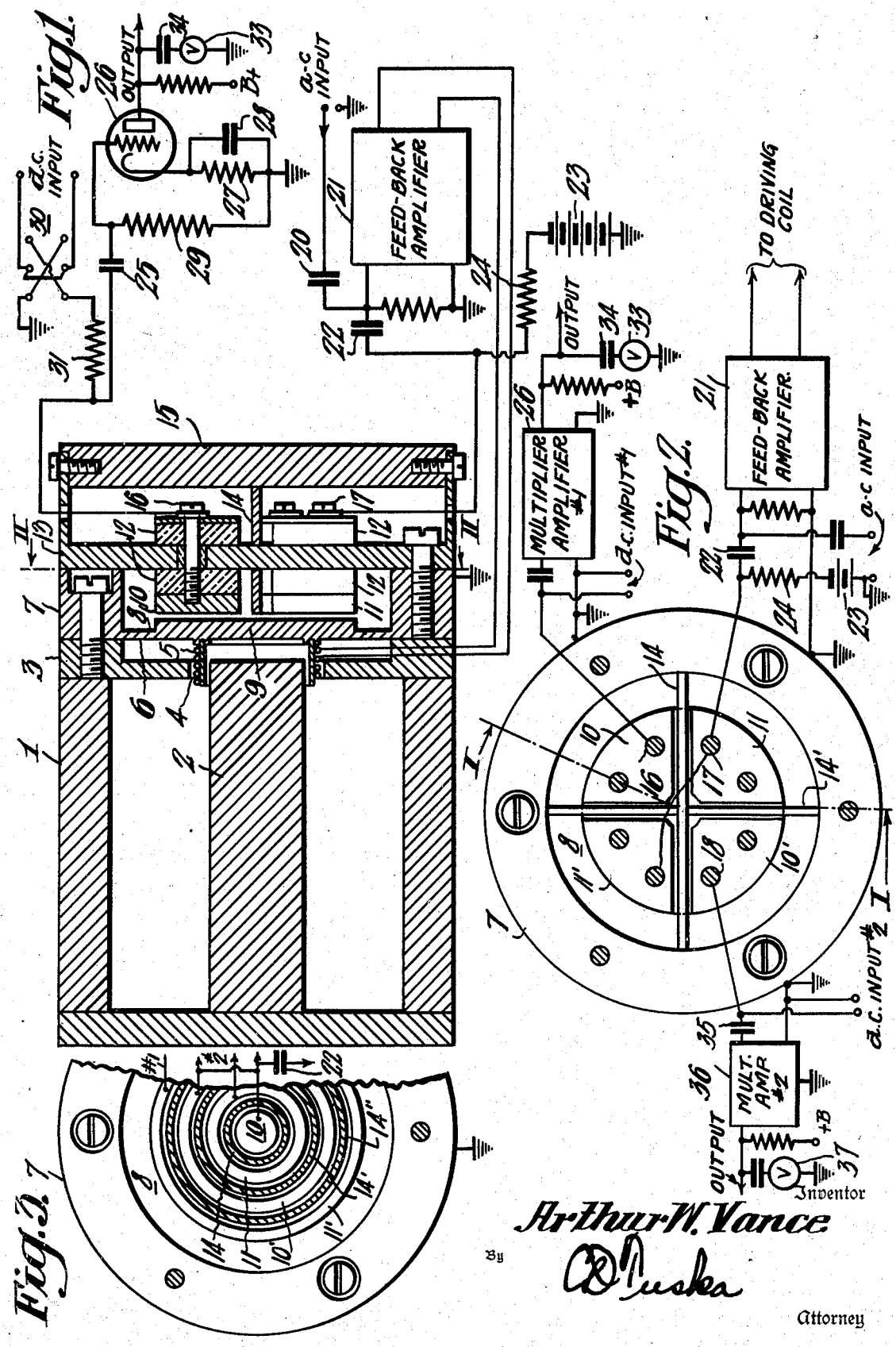
Inventor
Arthur W. Vance
By
CD Tuska
Attorney Patented June 4, 1946

2,401,527

UNITED STATES PATENT OFFICE 2,401,527

ELECTROMECHANICAL MULTIPLYING DEVICE

Arthur W. Vance, Cranbury, N. J., assignor to Radio Corporation of America, a corporation of Delaware Application March 30, 1943, Serial No. 481,084

10 Claims. (Cl. 235—61)

This invention relates generally to electronic computers and more particularly to an electromechanical multiplying device for deriving the product of two quantities applied to the device in the form of A.-C. and D.-C. voltages having amplitudes respectively proportional to the values of said quantities.

Various devices have been disclosed heretofore which employ thermionic tube circuits for deriving the product of two or more quantities, the values of which are represented by potentials or pulse trains. The principal disadvantage of such systems is the extremely large number or complexity of thermionic tubes required for deriving the product to the degree of accuracy required for a practical electronic computer. The instant invention provides a novel and simplified method for deriving such a product by employing a relatively simple variable capacitor device in combination with a simple thermionic tube circuit. A device of this general type may be constructed along conventional lines to provide a product having an accuracy of better than 1/10 of one percent.

It is well known that the electrical charge on a capacitor is proportional to the product of the applied voltage and the capacitance. The instant invention utilizes this characteristic by employing a capacitor, the capacitance of which is varied linearly by an A.-C. potential of amplitude proportional to the value of one of the quantities to be multiplied. A constant D.-C. potential is then applied to the electrodes of the capacitor through a relatively high impedance input circuit. The amplitude of the D.-C. potential is selected to be proportional to the value of the second of the quantities to be multiplied. The charge on the variable capacitor is applied, through a high impedance input circuit, to the control electrode of a conventional thermionic tube amplifier. The A.-C. output of the amplifier will therefore be directly proportional to the product of the amplitudes of the applied A.-C. and D.-C. potentials. Since both potentials are necessary for the derivation of an A.-C. component in the amplifier output, it will be apparent that no zero shift will be encountered in a multiplying device of this type. The phase of the A.-C. potential derived from the amplifier will be determined by the polarity of the D.-C. potential applied to the variable capacitor.

To improve the linearity of a multiplying device of the type described, a second variable capacitive device may be employed in combination with a conventional feedback amplifier, whereby the applied A.-C. potential may be fed through the feedback amplifier to drive the variable capacitive element, and the amplitude of the driving signal may be controlled by the variations of capacity produced in the second variable capacitive device. As a matter of practical construction, the variable capacitive devices may comprise fixed conductive electrodes in close capacitive relation with a heavy conductive diaphragm. The diaphragm may be caused to vibrate by means of a conventional voice coil attached thereto, which is subjected to a constant magnetic field. Such a constant magnetic field may be derived from a permanent magnet or electromagnetic structure of the type common in conventional loudspeaker field assemblies.

A plurality of variable capacitive devices may be actuated simultaneously, and connected to separate amplifiers for deriving independently the product of the A.-C. potential and a plurality of different applied D.-C. potentials. Since the phases of the A.-C. outputs from the various amplifiers may be controlled by the polarities of the applied D.-C. potentials, a device may be utilized to provide various combinations of the products of the quantities to be multiplied.

It is highly desirable that the diaphragm comprising the movable element of the various variable capacitors be relatively heavy, in order to minimize undesirable nodes which would be present in a relatively thin diaphragm. Undesirable nodes may also be minimized by utilizing a plurality of variable capacitive devices in the A.-C. drive feedback circuit and by spacing these feedback capacitive devices intermediate the variable capacitive devices utilized for deriving the various products.

Various modifications of the device described heretofore might employ fixed capacitive electrodes of either segmental or concentric ring form in operable relation to a circular, flat, heavy diaphragm portion.

Among the objects of the invention are to provide an improved electromechanical multiplying device for deriving the product of at least two quantities represented by A.-C. and D.-C. voltages of amplitudes respectively proportional to the values of said quantities. Another object of the invention is to provide an electronic computer employing an electromechanical multiplying device comprising at least one variable capacitive element wherein the capacitance is varied by an A.-C. potential of amplitude proportional to the value of one quantity, and the charge on the variable capacitive element is a D.-C. potential of amplitude proportional to the value of the other quantity. Still another object of the invention is to provide an improved electromechanical device for deriving the product of two quantities represented by A.-C. and D.-C. potentials of amplitudes directly proportional to the values of said quantities wherein a variable capacitive element is employed to control a feedback circuit which is actuated by an A.-C. potential applied to vary the capacitance of said capacitive element. A further object of the invention is to provide an improved method of and means for deriving electromechanically the product of two quantities represented by A.-C. and D.-C. voltages of amplitudes respectively proportional to the values of said quantities and for deriving simultaneously a second product of the first of said two quantities and a third quantity represented by a second D.-C. potential of amplitude proportional to the value of said third quantity. A further object of the invention is to provide an electromechanical multiplying device for deriving simultaneously the product of two quantities and the product of one of said quantities and a third quantity, and for combining said products.

The invention will be described in greater detail by reference to the accompanying drawing of which Figure 1 is a cross-sectional view of one embodiment thereof including a schematic circuit diagram of the associated circuits, Figure 2 is a sectional view taken along the line II—II of Figure 1 and including schematic circuit diagrams of a modification of said circuits and Figure 3 is a sectional view of another modification of said invention. Similar reference numerals are applied to similar elements throughout the drawing.

Figure 1 illustrates an electromechanical device including a permanent magnet or electromagnetic structure 1, 2 having an annular pole piece 3. The annular pole piece and the inner element 2 include an air gap 4 in which is disposed an electrodynamic driving coil 5. The driving coil 5 is mounted rigidly upon a conductive non-magnetic diaphragm 6 having an outer annular portion 7 rigidly mounted upon the magnetic structure 1. The diaphragm 6 includes a relatively thin annular portion 8 and a relatively heavy circular center portion 9. A plurality of fixed conductive elements 10, 11 are supported by insulating members 12 on a frame member 13 which is supported rigidly by the magnetic structure 1.

Shielding members 14, normal to the supporting member 13 and the diaphragm 6 are disposed between the several fixed capacitive elements 10, 11, respectively. The fixed capacitive elements are disposed substantially parallel to the center circular portion 9 of the diaphragm 6 and are spaced therefrom a distance of the order of .004 inch. The supporting member 13 may include a suitable cover 15 attached thereto for completing the shielding of the fixed capacitive elements 10, 11 and the terminals 16, 17 respectively connected thereto. The diaphragm 6 is preferably grounded on the supporting structure 1, 13. Suitable apertures are provided in the supporting member 13 for making electrical connections to the terminals 16, 17.

An A.-C. potential, not shown, of amplitude proportional to the value of one quantity to be multiplied, is applied through a coupling capacitor 20 to the input of a feedback thermionic tube amplifier 21. The terminal 17 connected to the fixed capacitive element 11 is connected through a second coupling capacitor 22 to the input of the feedback amplifier 21. The remaining terminal of the feedback amplifier input is connected to ground. The output of the feedback amplifier 21 is connected to the terminals of the driving coil 5 of the electromechanical device described hereinbefore. The positive terminal of a source of reference potential, such as a battery 23, is connected to ground. The negative terminal thereof is connected through a high resistance 24 to the terminal 17 of the fixed capacitive element 11.

The terminal 16 of the fixed capacitive element 10 is connected through a third coupling capacitor 25 to the control electrode of an amplifying thermionic tube 26. The cathode circuit of the amplifier tube 26 includes a conventional cathode resistor 27 and cathode capacitor 28. A high resistance 29 is connected between the control electrode of the amplifier tube 26 and ground.

A D.-C. potential, of amplitude proportional to the value of a second quantity to be multiplied, is applied to the movable element of a reversing switch 30. One of the fixed contacts of the reversing switch 30 is connected to ground. The other fixed contact is connected through a high resistance coupling resistor 31 to the terminal 16 of the fixed capacitive element 10. The anode of the amplifier tube 26 is connected to any desired utilization circuit, and to a source of operating potential not shown. As explained heretofore, any A.-C. potentials occurring in the anode circuit of the amplifier tube 26 will be proportional to the product of the amplitudes of the applied A.-C. and D.-C. potentials which in turn are proportional to the values of each of the quantities to be multiplied. These output potentials may be indicated, for example, on an A.-C. voltmeter 33 connected, through a blocking capacitor 34, across the anode circuit of the amplifier tube 26.

The operation of the feedback amplifier circuit is similar to that employed in conventional electro-acoustic circuits whereby non-linearity of vibration of the diaphragm 6 provides compensating potentials which vary the gain of the feedback amplifier, thereby correcting for such non-linearity.

Figure 2 illustrates an embodiment which employs four segmental fixed capacitive electrodes 10, 11, 10' and 11', as well as the shielding elements 14, 14', and which employs three amplifiers instead of two as shown in Fig. 1.

The outer heavy portion 7 of the diaphragm is connected to ground. The terminal 16 of the first fixed capacitive element 10 is connected to one of the input terminals of the first multiplier amplifier 26. The remaining input terminal of the amplifier 26 is grounded. A first source of D.-C. input is connected as described heretofore to the terminal 16 of the first segmental fixed capacitive electrode 10, and to ground.

The A. C. output of the first multiplier amplifier 26 will be proportional to the product of the amplitudes of the first D. C. input and the A. C. input as described heretofore. The second and fourth segmental fixed capacitive electrodes 11, 11' are connected together and connected to one of the input terminals of the feedback amplifier 21. The output of the feedback amplifier 21 is connected to the driving coil 5 as described heretofore. The terminal 18 of the third segmental fixed capacitive electrode 10' is connected to one of the input terminals of a second multipler amplifier 36 through a coupling capacitor 35 in the same manner as described heretofore for the first multiplier amplifier 26. Similarly, the remaining input terminal of the second multiplier amplifier 36 is grounded, and a second D. C. voltage of amplitude proportional to the value of a third quantity is applied to the third capacitive electrode 10' and the diaphragm 6. The A. C. output of the second multiplier amplifier 36 will therefore be proportional to the product of the amplitudes of the A. C. input voltage and the second D. C. input voltage. It should be understood that the phases of the output voltages derived from the first and second multiplier amplifiers 26, 36 respectively, will depend upon the polarity of the D. C. potentials applied to the corresponding fixed capacitive electrodes which are connected thereto. The A. C. outputs of the first and second multiplier amplifiers may be indicated by A. C. voltmeters 33, 37, respectively, as explained heretofore.

Figure 3 is a sectional view of a second modification of the electromechanical device described, wherein the fixed capacitive eelctrodes are arranged in the form of concentric rings which are equidistantly spaced from the center portion 9 of the diaphragm 6. The shielding elements 14, 14' and 14'' are disposed concentrically between the concentric fixed capacitive electrodes 10, 11, 10' and 11'. Connections may be made in any desired manner to the several concentric fixed capacitive electrodes for connecting them to the input circuits of the first and second multiplier amplifiers and the feedback amplifier respectively. The type of construction illustrated in Figure 3 may be desirable from the standpoint of minimizing the nodes inherent in all types of vibrating diaphragms.

Thus the invention described comprises a novel electro-mechanical multiplying device for deriving a plurality of products of quantities represented by A. C. and D. C. voltages of amplitudes respectively proportional to the values of said quantities, wherein said voltages are applied to vary the electrical charges on capacitive elements of said device.

I claim as my invention:

1. An electro-mechanical multiplying device for deriving the product of two quantities represented by A. C. and D. C. voltages of amplitudes respectively proportional to the values of said quantities including a vibratory element, at least one fixed element disposed in reactive relation to said vibratory element, means responsive to said A. C. voltage for providing vibration of said vibratory element to vary thereby the reactance between said elements, means for applying said D. C. voltage to said elements, an output circuit, means connecting said elements to said output circuit, and means for deriving from said output circuit potentials substantially proportional to the product of the amplitudes of said A. C. and said D. C. voltages.

2. An electro-mechanical multiplying device for deriving the product of two quantities represented by A. C. and D. C. voltages of amplitudes respectively proportional to the values of said quantities including a vibratory electrode, at least one fixed electrode disposed in capacitive relation to said vibratory electrode, means responsive to said A. C. voltage for providing vibration of said vibratory electrode to vary thereby the capacitance between said electrodes, means for applying said D. C. voltage to said electrodes, an output circuit, means connecting said electrodes to said output circuit, and means for deriving from said output circuit potentials substantially proportional to the product of the amplitudes of said A. C. and said D. C. voltages.

3. An electro-mechanical multiplying device for deriving the product of two quantities represented by A. C. and D. C. voltages of amplitudes respectively proportional to the values of said quantities including a vibratory electrode, at least one fixed electrode disposed in capacitive relation to said vibratory electrode, means substantially linearly responsive to the amplitude of said A. C. voltage for providing vibration of said vibratory electrode to vary thereby the capacitance between said electrodes, means for applying said D. C. voltage to said electrodes, an output circuit, means connecting said electrodes to said output circuit, and means for deriving from said output circuit potentials substantially proportional to the product of the amplitudes of said A. C. and said D. C. voltages.

4. An electro-mechanical multiplying device for deriving the product of two quantities represented by A. C. and D. C. voltages of amplitudes respectively proportional to the values of said quantities including a vibratory electrode, a plurality of fixed electrodes disposed in capacitive relation to said vibratory electrode, means responsive to said A. C. voltage for providing vibration of said vibratory electrode to vary thereby the capacitance between said fixed and said vibratory electrodes, means for applying said D. C. voltage to at least one of said fixed and said vibratory electrodes, an output circuit, means connecting at least one of said fixed and said vibratory electrodes to said output circuit, and means for deriving from said output circuit potentials substantially proportional to the product of the amplitudes of said A. C. and said D. C. voltages.

5. Apparatus of the type described in claim 4 including a feedback amplifier having an input circuit and an output circuit, means including a source of unilateral potential connecting said amplifier input circuit to at least one other of said fixed electrodes and said vibratory electrode, and means connecting said amplifier output circuit to said vibration providing means for compensating non-linearity of vibration amplitude of said vibratory electrode in response to said A. C. voltage.

6. Apparatus of the type described in claim 4 including indicating means responsive to said derived potentials for indicating said product.

7. An electro-mechanical multiplying device for deriving the product of two quantities represented by A. C. and D. C. voltages of amplitudes respectively proportional to the values of said quantities including a vibratory electrode, a plurality of fixed electrodes disposed in capacitive relation to said vibratory electrode, electrostatic shielding means interposed between said fixed electrodes, electrodynamic means responsive to said A. C. voltage for providing vibration of said vibratory electrode to vary thereby the capacitance between said several fixed electrodes and said vibratory electrode, means for applying said D. C. voltage to said vibratory electrode and at least one of said fixed electrodes, an output circuit, means connecting at least one of said fixed electrodes and said vibratory electrode to said output circuit, and means for deriving from said output circuit potentials substantially proportional to the product of the amplitudes of said A. C. and said D. C. voltages.

8. An electro-mechanical multiplying device for deriving the product of two quantities represented by A. C. and D. C. voltages of amplitudes respectively proportional to the values of said quantities including a vibratory electrode, a plurality of segmental electrodes disposed in reactive relation to said vibratory electrode, electrostatic shielding means interposed between said fixed electrodes, permanent magnet electro-dynamic means responsive to said A. C. voltage for providing vibration of said vibratory electrode to vary thereby the capacitance between said several fixed electrodes and said vibratory electrode, means for applying said D. C. voltage to said vibratory electrode and at least one of said fixed electrodes, a high impedance output circuit, means including a coupling capacitor connecting at least one of said fixed electrodes and said vibratory electrode to said output circuit, and means for deriving from said output circuit A. C. potentials of amplitude substantially proportional to the product of the amplitudes of said A. C. and said D. C. voltages.

9. An electro-mechanical multiplying device for deriving the product of two quantities represented by A. C. and D. C. voltages of amplitudes respectively proportional to the values of said quantities including a vibratory electrode, a plurality of concentrically arranged electrodes disposed in reactive relation to said vibratory electrode, electrostatic shielding means interposed between said fixed electrodes, permanent magnet electro-dynamic means responsive to said A. C. voltage for providing vibration of said vibratory electrode to vary thereby the capacitance between said several fixed electrodes and said vibratory electrode, means for applying said D. C. voltage to said vibratory electrode and at least one of said fixed electrodes, a high impedance output circuit, means including a coupling capacitor connecting at least one of said fixed electrodes and said vibratory electrode to said output circuit, and means for deriving from said output circuit A. C. potentials of amplitude substantially proportional to the product of the amplitudes of said A. C. and said D. C. voltages.

10. An electro-mechanical multiplying device for deriving the product of two quantities represented by A. C. and D. C. voltages of amplitudes respectively proportional to the values of said quantities including a first reactor element, at least one additional element disposed in reactive relation to said first element, means responsive to said A. C. voltage for providing variations of the reactance between said elements, means for applying said D. C. voltage to said elements, an output circuit, means connecting said elements to said output circuit, and means for deriving from said output circuit potentials substantially proportional to the product of the amplitudes of said A. C. and said D. C. voltages.

ARTHUR W. VANCE.